(12) United States Patent
Breugelmans (10) Patent No.: US 11,966,278 B2
(45) Date of Patent: Apr. 23, 2024

(54) SYSTEM AND METHOD FOR LOGGING VISIBLE ERRORS IN A VIDEOGAME

(71) Applicant: Sony Interactive Entertainment Inc., Tokyo (JP)

(72) Inventor: Mark Jacobus Breugelmans, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 24 days.

(21) Appl. No.: 17/729,118

(22) Filed: Apr. 26, 2022

(65) Prior Publication Data

US 2022/0350693 A1  Nov. 3, 2022

(30) Foreign Application Priority Data

Apr. 28, 2021 (GB) ..................... 2106065

(51) Int. Cl.
*G06F 11/07* (2006.01)
*G06F 11/32* (2006.01)

(52) U.S. Cl.
CPC ...... *G06F 11/0772* (2013.01); *G06F 11/0775* (2013.01); *G06F 11/0778* (2013.01); *G06F 11/327* (2013.01)

(58) Field of Classification Search
CPC ............. G06F 11/0772; G06F 11/0775; G06F 11/0778; G06F 11/327
See application file for complete search history.

(56) References Cited

U.S. PATENT DOCUMENTS 9,164,580 B2 * 10/2015 Katz ................ G06F 21/32
9,213,404 B2 * 12/2015 Elvesjö ............... G06F 3/167
9,244,539 B2 * 1/2016 Venable ................ G06V 40/19
9,256,784 B1  2/2016 Taylor
9,846,486 B2 * 12/2017 Katz ...................... G06F 3/013

(Continued)

FOREIGN PATENT DOCUMENTS

CA         3133317 A1 * 10/2020 ........... A61B 3/0033
WO   WO-2015060936 A1 *  4/2015 ............ G06F 3/013

OTHER PUBLICATIONS

Extended European Search Report for corresponding EP Application No. 22169974.7, 9 pages, dated Sep. 14, 2022.

(Continued)

*Primary Examiner* — Matthew M Kim
*Assistant Examiner* — Indranil Chowdhury
(74) *Attorney, Agent, or Firm* — Matthew B. Dernier, Esq.

(57) ABSTRACT

A method of error logging includes: receiving from a user interface a first input from a user indicating that they have seen a visible error in a displayed graphical output of a computer application, tracking the gaze of the user to estimate the position, on at least a first display showing at least part of the displayed graphical output, at which the user's gaze is directed, receiving from the user interface a second input from the user indicating that they have identified the visible error with their gaze, capturing data relating to the displayed graphical output of the computer application, the data including a capture of at least part of the displayed graphical output including the identified visible error, and the estimated positon of the user's gaze with respect to the displayed graphical output, and generating an error report including the captured data.

15 Claims, 4 Drawing Sheets

(56) References Cited

U.S. PATENT DOCUMENTS

| | | | | |
|---|---|---|---|---|
| 9,908,049 B2* | 3/2018 | Stafford | ................. | G06F 3/016 |
| 9,971,401 B2* | 5/2018 | Stafford | ................. | G06F 3/013 |
| 10,248,192 B2* | 4/2019 | Lehman | ................. | G06F 3/017 |
| 10,891,219 B1* | 1/2021 | Dimitropoulos | ...... | A63F 13/352 |
| 10,915,168 B2* | 2/2021 | Dai | ........................ | G06F 3/011 |
| 11,551,377 B2* | 1/2023 | Lagun | .................... | G06V 40/19 |
| 11,868,523 B2* | 1/2024 | Rodgers | ............. | G02B 27/0172 |
| 2005/0047629 A1* | 3/2005 | Farrell | .................... | G06F 3/013 |
| | | | | 382/116 |
| 2014/0368442 A1* | 12/2014 | Vahtola | .................. | G06F 3/013 |
| | | | | 345/173 |
| 2015/0193018 A1 | 7/2015 | Venable | | |
| 2016/0162020 A1* | 6/2016 | Lehman | ................. | G06F 3/017 |
| | | | | 715/835 |
| 2016/0217767 A1* | 7/2016 | Ben-Bassat | ............. | G06F 3/012 |
| 2017/0358141 A1* | 12/2017 | Stafford | ................. | G06T 11/60 |
| 2018/0224935 A1* | 8/2018 | Thunström | ............. | G06F 3/013 |
| 2019/0079818 A1* | 3/2019 | Handa | ................. | G06F 11/0778 |
| 2019/0197825 A1 | 6/2019 | Meunier | | |
| 2019/0324528 A1* | 10/2019 | Williams | ................ | G06F 18/40 |
| 2020/0051367 A1 | 2/2020 | Larsen | | |
| 2022/0236797 A1* | 7/2022 | Drozdov | ............. | G06V 40/161 |
| 2022/0350399 A1* | 11/2022 | Uberti | .................... | G06V 40/10 |

OTHER PUBLICATIONS

Combined Search and Examination report for corresponding GB Application No. GB2106065.2, 11 pages, dated Jan. 21, 2022.

\* cited by examiner

SYSTEM AND METHOD FOR LOGGING VISIBLE ERRORS IN A VIDEOGAME

BACKGROUND OF THE INVENTION

Field of the Invention

The present invention relates to a system and method of error logging.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

During quality assurance testing of videogames and other computer-generated experiences, the process of logging bugs or errors apparent to the tester can be a slow process requiring identification of the observed problem, creating an appropriate record of the problem, and then returning to testing.

This process is exacerbated for virtual reality applications, where the user must additionally remove a head mounted display in order to create an appropriate record and then put the head mounted display back on to resume.

The present invention seeks to address or mitigate this problem.

SUMMARY OF THE INVENTION

In a first aspect, a method of error logging is provided in accordance with claim 1.

In another aspect, an error logging system is provided in accordance with claim 10.

Various other aspects and features of the present invention are defined in the appended claims and within the text of the accompanying description.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A system and method of error logging are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
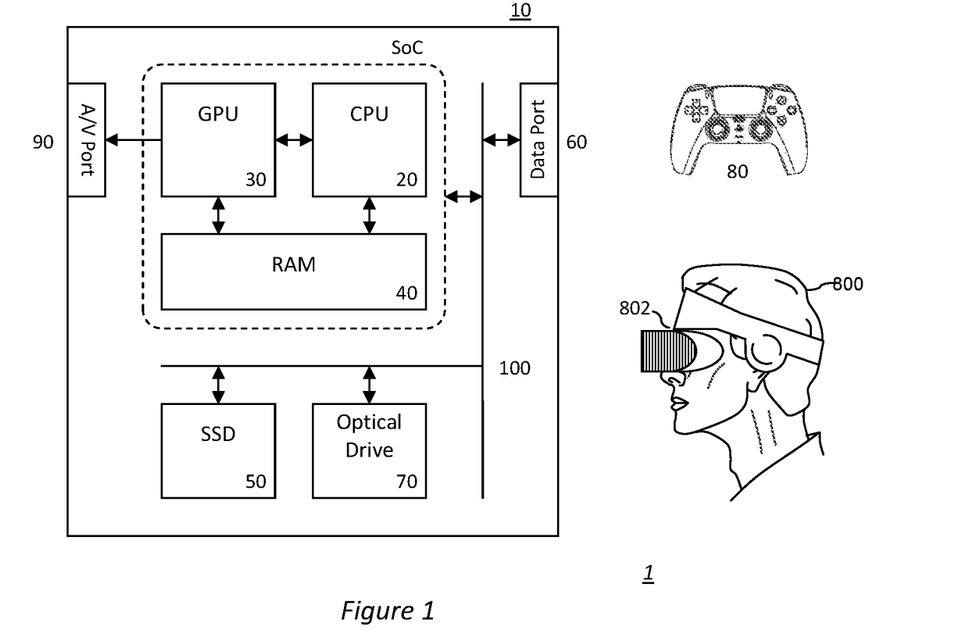
FIG. 1 is a schematic diagram of an error logging system in accordance with embodiments of the present description.

Referring now to the drawings, wherein like reference numerals designate identical or corresponding parts throughout the several views, in FIG. 1 an example of a system of error logging 1 comprises an entertainment system 10 such as a computer or console like as the Sony® PlayStation 5® (PS5), or equivalently a development kit for such a console, together with a display such as optionally a head mounted display 802 and an input means such as optionally a controller 80.

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

It will be appreciated that a head mounted display 'HMD' 802, worn by a user 800, can display images output by the entertainment system.

Figure 2:
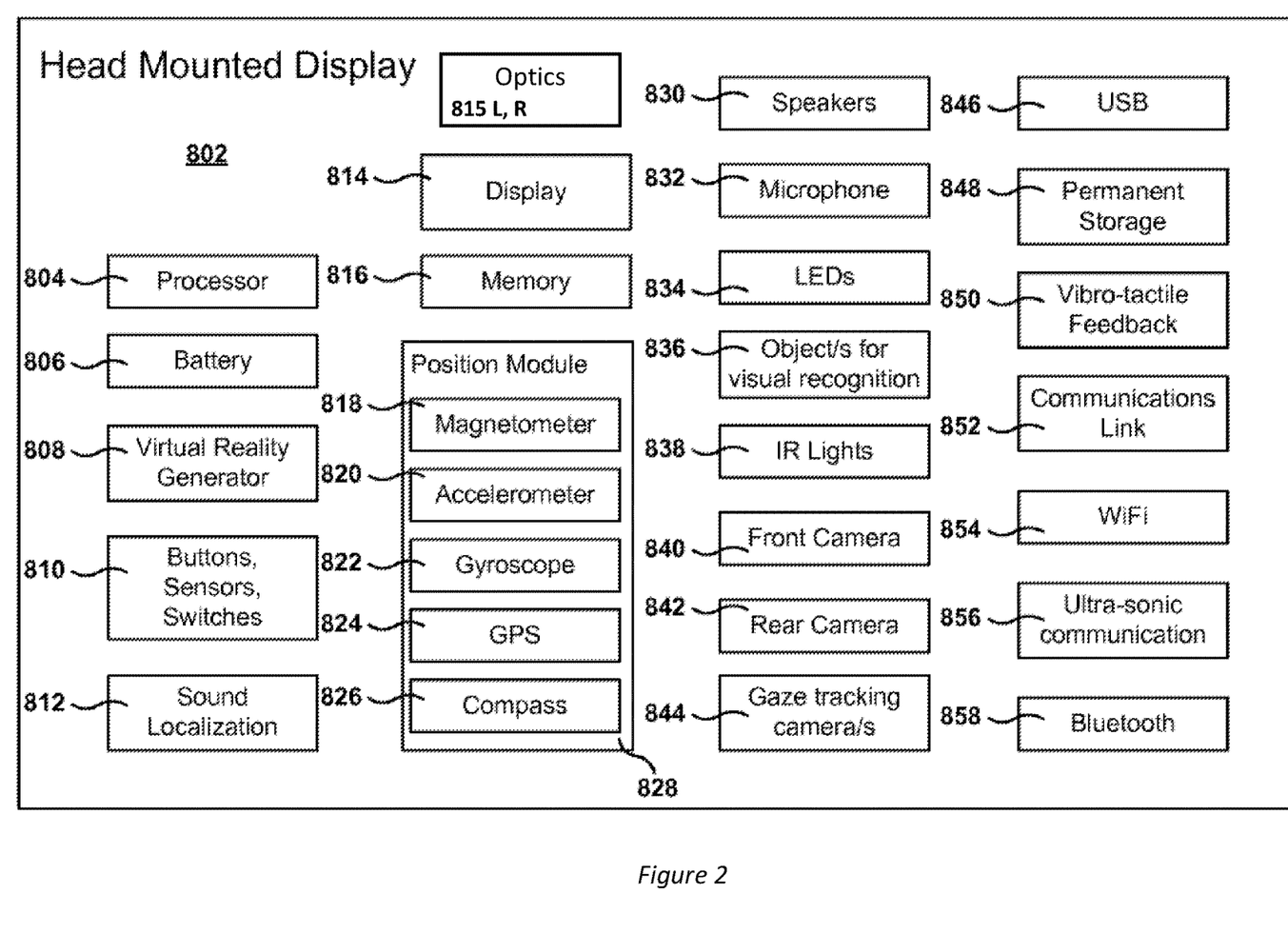
FIG. 2 is a schematic diagram of functional blocks of a head mounted display in accordance with embodiments of the present description.

Referring now to FIG. 2, this illustrates the architecture of an example HMD device. The HMD may also be a computing device and may include modules usually found on a computing device, such as one or more of a processor 804, memory 816 (RAM, ROM, etc.), one or more batteries 806 or other power sources, and permanent storage 848 (such as a solid state disk).

One or more communication modules can allow the HMD to exchange information with other portable devices, other computers (e.g. the PS5®), other HMDs, servers, etc. Communication modules can include a Universal Serial Bus (USB) connector 846, a communications link 852 (such as Ethernet®), ultrasonic or infrared communication 856, Bluetooth® 858, and WiFi® 854.

A user interface can include one or more modules for input and output. The input modules can include input buttons (e.g. a power button), sensors and switches 810, a microphone 832, a touch sensitive screen (not shown, that may be used to configure or initialize the HMD), one or more front cameras 840, one or more rear cameras 842, one or more gaze tracking cameras 844. Other input/output devices, such as a keyboard or a mouse, can also be connected to the portable device via communications link, such as USB or Bluetooth®.

The output modules can include the display 814 for rendering images in front of the user's eyes. Some embodiments may include one display, two displays (one for each eye), micro projectors, or other display technologies. The user typically sees the or each display through left and right optical assemblies 815 L, R. Other output modules can include Light-Emitting Diodes (LED) 834 (which may also be used for visual tracking of the HMD), vibro-tactile feedback 850, speakers 830, and a sound localization module 812, which performs sound localization for sounds to be delivered to speakers or headphones. Other output devices, such as headphones, can also connect to the HMD via the communication modules, be permanently attached to the HMD, or integral to it.

One or more elements that may be included to facilitate motion tracking include LEDs 834, one or more objects for visual recognition 836, and infrared lights 838. Alternatively or in addition, the one or more front or rear cameras may facilitate motion tracking based on image motion.

Information from one or more different modules can be used by the position module 828 to calculate the position of the HMD. These modules can include a magnetometer 818, an accelerometer 820, a gyroscope 822, a Global Positioning System (GPS) module 824, and a compass 826. Alternatively or in addition, the position module can analyse image data captured with one or more of the cameras to calculate the position. Further yet, optionally the position module can perform tests to determine the position of the portable device or the position of other devices in the vicinity, such as a WiFi ping test or ultrasound tests.

A virtual reality generator 808 then outputs one or more images corresponding to a virtual or augmented reality environment or elements thereof, using the position calculated by the position module. The virtual reality generator 808 may cooperate with other computing devices (e.g., P55® or other game console, Internet server, etc.) to generate images for the display module 814. The remote devices may send screen updates or instructions for creating game objects on the screen. Hence the virtual reality generator 808 may be responsible for none, some, or all of the generation of one or more images then presented to the user, and/or may be responsible for any shifting of some or all of one or both images in response to inter-frame motion of the user (e.g. so-called reprojection).

It should be appreciated that the embodiment illustrated in FIG. 2 is an exemplary implementation of an HMD, and other embodiments may utilize different modules, a subset of the modules, or assign related tasks to different modules. The embodiment illustrated in FIG. 2 should therefore not be interpreted to be exclusive or limiting, but rather exemplary or illustrative. It will also be appreciated that the functionality of at least a subset of the modules may be provided by, or in concert with, corresponding modules of the entertainment device (in turn typically provided by a processor of that device operating under suitable software instruction).

Figure 3:
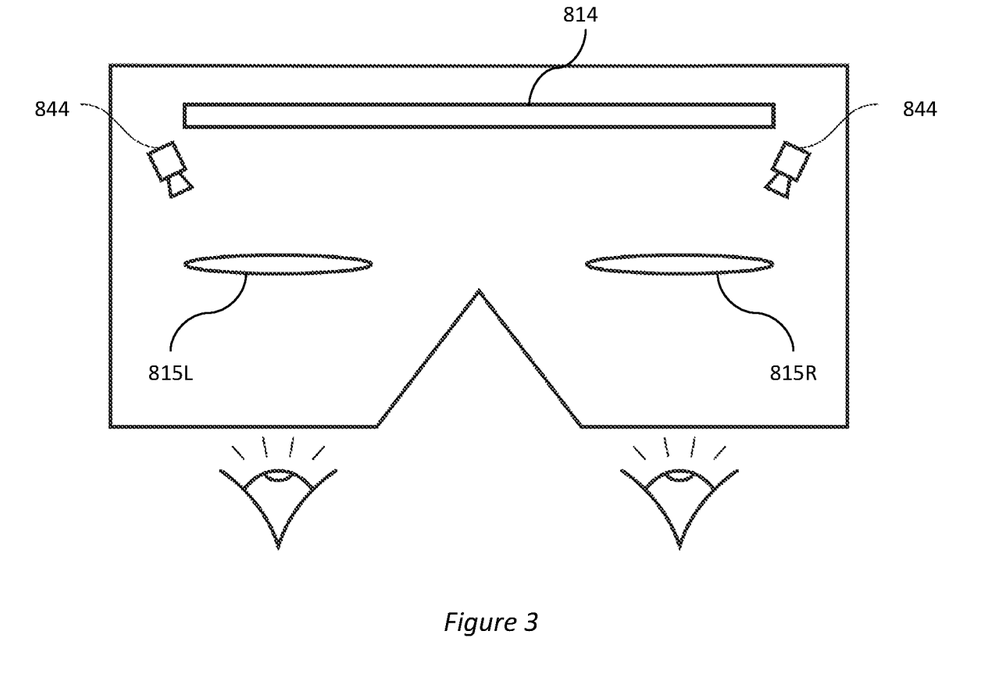
FIG. 3 is a schematic diagram of a head mounted display in accordance with embodiments of the present description.

Turning now to FIG. 3, this provides a simplified plan view of an HMD, comprising a display 814 (although as noted above, respective left and right displays may be used), optics 815L,R between the display and the user's eyes, and at least one gaze tracking camera 844. Optionally only one gaze tracking camera is needed (e.g. for the left or right eye, or where both eyes are visible to the same camera, then one or both eyes). A second camera can be beneficial if the camera placement within an HMD makes tracking (for example based on pupil position) difficult when the user looks away from the direction of the camera. By having cameras on the left of one eye and the right of the other, and given that users eyes normally act in concert to look at a target position, then this arrangement typically means that at least one pupil remains in clear view wherever the user gazes with respect to the display(s), enabling continuous gaze tracking.

The method of error logging described herein comprises using the gaze tracking capability of an HMD to enable a quality assurance tester or other user to identify a visible error by gazing at it whilst wearing the HMD.

Examples of such errors may include object clipping, lighting errors, incorrect textures or missing textures, rendering errors (e.g. pixels or groups of pixels showing incorrect colour information), depth buffer errors, transparency errors, anti-aliasing errors, texture mapping or bump mapping errors and the like, or similarly errors that not directly related to generation of the image but are nevertheless visible, such as positional errors, animation errors or other behavioural errors in elements of the environment and/or non-player characters.

Using such a gaze based approach, when a quality assurance tester sees evidence of an error displayed to them they can hold a start capture button (for example a predetermined button on their controller 80, or a predetermined button on the HMD, or a mouse button or a predetermined keyboard button as appropriate).

The user may then gaze at the specific problem area, with the position of their gaze being identified by a gaze tracking system, for example of the kind described elsewhere herein.

Optionally the gaze tracking system can indicate on the display where it estimates the user's gaze to be (for example by overlaying a reticule on the display), to provide the user with feedback as to where the system estimates they are gazing.

It will be appreciated that the gaze tracking system (for example a gaze tracking processor operating in conjunction with at least one gaze tracking camera, possibly on different devices) is operable to determine where within the displayed image the user is gazing, for example by relating the position of the or each eye of the user within an image captured by one or more cameras to a position on the display, based upon a known and fixed relationship between the location of the or each camera and the location of the or each display, and optionally also the known field of view of the or each camera. Hence depending upon the position and direction of gaze of the eyes in the or each captured image, and the relative position of the or each camera to the or each display, the intersection of the direction of gaze from the or each eye of the user to a position on the or each respective display can be calculated.

Hence optionally this intersection position can be indicated using a reticule, shading (e.g. a shaded or tinted circle), an icon, and/or any other appropriate graphical technique.

Hence either with or without a graphical indicator of the user's estimated gaze position, the user satisfies themselves that they are looking at the specific problem area (preferably ensuring that the graphical indicator is located at the desired position, if the indicator is provided), and then releases the start capture button to complete a capture process.

Instead of holding the start capture button whilst gazing at the specific problem area and releasing the button to indicate its selection, alternatively the start capture button may be pressed once to indicate that the user intends to gaze at the specific problem area (and optionally causing display of the graphical indicator tracking the user's estimate gaze position), and this button may then be pressed again to complete the capture process. Other equivalent two-stage inputs may be similarly considered, such as pressing one button to start capture and another different button to complete it, or half pressing a trigger button to start the capture process and then fully depressing it to complete the process.

The capture process typically comprises capturing and saving a screenshot (or optionally several screenshots if the HMD displays separate left and right images) comprising the specific problem area together with details of the gaze intersection coordinates within that image. The screenshot itself may or may not comprise the graphical indicator if this is displayed to the user.

Optionally the capture process may also save other information relevant to determining the cause of the error, such as in-game coordinates (for example for the virtual camera capturing the image, and optionally the coordinates of the feature in the virtual scene corresponding to the gaze position), the user's head direction and/or any telemetry from the HMD (for example in case the apparent graphical issue is due to a misinterpretation of the user's viewpoint), and/or any inputs from the controller.

Alternatively or in addition, any other suitable data relating to the internal state of game may be saved, such as a list of game and/or system variables, the draw list used when generating the image then captured as a screenshot, and/or memory dumps for example of a z-buffer, raster buffer, or output buffer, or a core dump or other memory snapshot of the application (e.g. of its working memory). Other metadata may be stored such as the time and date and the name (and/or user id) of the user or quality assurance tester who initiated the capture.

Hence more generally if the user or quality assurance tester detects graphical evidence of an error, they can initiate a gaze based reporting process in which optionally the estimated position of their gaze is included on one or more displays, and in any event when they are satisfied that they are gazing at the specific problem area (e.g. the area of the display comprising the graphical evidence of an error), they can complete the capture of the data to be used in the report.

This two-step process can be initiated using any suitable input on the controller, HMD or other input device. Optionally if the controller, HMD, console, or development kit comprises a microphone, then one or both steps of this process can be initiated using verbal commands, and further optionally any comments made by the user in relation to the error can be recorded and/or transcribed (e.g. by a speech to text system). Similarly optionally one or both steps of this process could be initiated by one or more hand gestures, or a nod of the head, or a gaze gesture (for example the user rolling their eyes, or deliberately looking in one, two, three, or four corners of the display, optionally in a specific sequence).

Variations on this approach may include tracking the path of the user's gaze to draw a gaze trail; for example in this way the user could outline the specific problem area using their gaze, and this path could be saved as part of the capture process.

Another variation may include a zoom feature, where a secondary input (for example a button) allows a user to zoom in on the area of interest for closer inspection. This zoom may be a magnification of the rendered image (i.e. without changing the position or properties of the virtual camera generating the image), or may be a magnification caused by repositioning virtual camera closer to the area of interest, or changing the virtual optical properties of the camera to increase magnification; however in this case it is possible that the change in circumstance of the camera may cause a graphical error to change or disappear, or potentially become worse, for example to the extent that the application crashes. Hence in a first instance it may be preferable simply to magnify the existing rendered image on the display.

Optionally initiating the capture process may cause the game to pause, so that the current image is static whilst the user positions their gaze for reporting purposes. This pause may be actual (i.e. instigating the capture process also causes the game to pause) or may be an effect created by the error logging system, e.g. by capturing the displayed image(s) at the start of the capture process and displaying these instead of the current game output so that the image appears static whilst the user identifies the area of interest for the report.

Alternatively, the capture process may comprise capturing a video clip with gaze position information being associated with each frame of the video or a subset thereof, the video clip starting with the first capture initiating step and ending with the second (hence for example the video clip occurring whilst a capture button is held, or alternatively between first and second presses of such a button, and the like).

It will also be appreciated that whilst the above approach is of particular use for reporting errors when wearing an HMD for virtual reality applications, it is not limited to this. In particular it can also be used for augmented reality applications (where in principle the user could also see their environment), and also for users who are not wearing an HMD at all, but are using one or more monitors or televisions. In this latter case, the user's gaze may be tracked by a separate camera, such as for example a webcam or similar. In this case, a calibration step may be required, for example asking the user to look at a displayed position on screen, in order to determine the positional interrelationship between user, camera and screen.

The computer application itself typically generates a virtual environment for the purposes of playing a videogame, but alternatively or in addition may for example be a virtual television or film set, simulated environment (for example corresponding to a simulated physics environment or simulated behavioural environment), or any other application where a virtual space is graphically rendered.

It will be appreciated that unlike detecting an error in static text by detecting a change in reading pattern, the techniques of the present description relate to dynamic environments (games, movies, and the like) where the content and/or the framing of that content is continually changing. Hence timing is also a factor if a displayed point (such as the location of a bug) can change with time. Similarly depth can also be a factor in relation to the virtual world being displayed.

Hence it will be appreciated that a particular benefit of the techniques of the present description arise from the two-factor nature of the user selection; that the user explicitly selects when to report/capture date on a bug that is being viewed. Such a multi-modal selection method (such as gaze & mouse/controller input) encapsulates the timing but also optionally provides a way to zoom in on a bug or place a line around a bug in combination with gaze. Hence for example instead of drawing (circling) an area with a mouse/controller, the eye can be used to select the area of concern while the mouse/controller is used to select the timing.

It will also be appreciated that for example during quality assurance testing, screenshots can be taken of the screen for spotting bugs. Gaze location can then be marked in the screenshot. Optionally for example a filter can be applied to the area of the screen that is being viewed—e.g., black and white for everything except the gaze region, or vice versa, to enable/ease rapid assimilation of potentially many bug reports. Other filters that may optionally be applied include increasing colour saturation, image sharpening, increasing contrast, and the like)

Alternatively or in addition such a filter could optionally be provided during the multi-modal selection method; for example pressing a mouse button to enter the filtered view mode, using gaze to highlight/track the region comprising the bug, optionally using an input just as a scroll wheel or joystick to adjust the region size, and pressing a mouse button to report/capture the bug.

Figure 4:
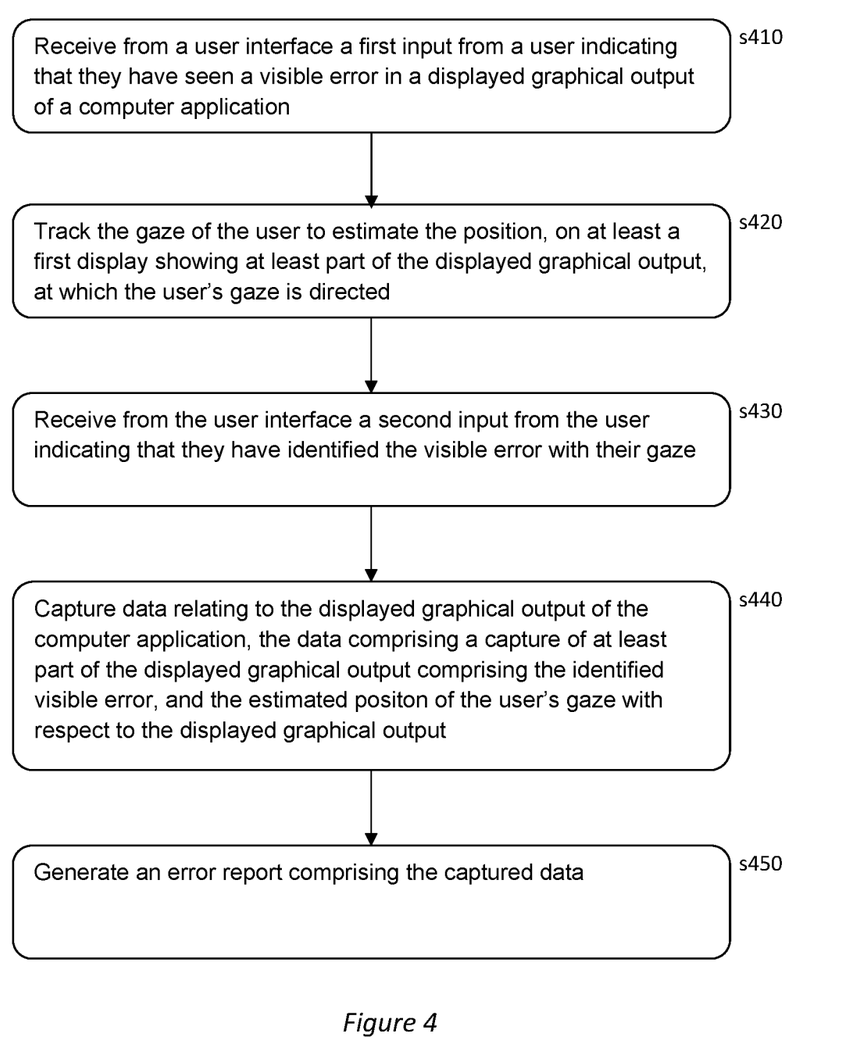
FIG. 4 is a flow diagram of a method of error logging in accordance with embodiments of the present description.

In a summary embodiment of the present description, a method of error logging comprises the following steps.

In a first step s410, receive from a user interface a first input from a user indicating that they have seen a visible error in a displayed graphical output of a computer application, as described elsewhere herein.

In a second step s420, track the gaze of the user (for example using at least a first gaze tracking camera and gaze tracking processor as discussed elsewhere herein) to estimate the position, on at least a first display showing at least part of the displayed graphical output, at which the user's gaze is directed, as described elsewhere herein.

In a third step s430, receive from the user interface a second input from the user indicating that they have identified the visible error with their gaze, as described elsewhere herein.

In a fourth step s440, capturing data relating to the displayed graphical output of the computer application, the data comprising a capture of at least part of the displayed graphical output comprising the identified visible error, and the estimated positon of the user's gaze with respect to the displayed graphical output, as described elsewhere herein.

And in a fifth step s450, generate an error report comprising the captured data.

It will be apparent to a person skilled in the art that variations in the above method corresponding to operation of the various embodiments of the method and/or apparatus as described and claimed herein are considered within the scope of the present disclosure, including but not limited to that:

the user interface comprises one or more selected from the list consisting of at least a button or trigger on a handheld controller or on a head-mounted display; a microphone (for example on a controller or head-mounted display, or on a webcam) operably coupled to a keyword recognition processor (such as processor 804 or CPU 20, or any combination thereof, operating under suitable software instruction); a camera (for example a front camera 840 or rear camera 842, or a separate camera such as a webcam) operably coupled to a gesture recognition processor (such as processor 804 or CPU 20, or any combination thereof, operating under suitable software instruction); a motion detector (such as an accelerometer 820 or gyroscope 822 of an HMD or of a handheld controller) operably coupled to a gesture recognition processor (such as processor 804 or CPU 20, or any combination thereof, operating under suitable software instruction); and a gaze sequence detector (such as processor 804 or CPU 20, or any combination thereof, operating under suitable software instruction) operably coupled to a gaze tracking processor (again such as processor 804 or CPU 20, or any combination thereof, operating under suitable software instruction), each as described elsewhere herein;

the method comprises the step of displaying the estimated position of the user's gaze as part of the displayed graphical output visible to the user, as described elsewhere herein;

in this case, optionally the step of displaying the estimated position comprises one or more selected from the list consisting of displaying an indicator at the currently estimated locus of the user's gaze; and displaying an indicator of the historical path of the user's gaze subsequent to receiving the first input from the user, as described elsewhere herein;

the step of capturing data further comprises capturing one or more selected from the list consisting of coordinates corresponding to the position of a virtual camera used to generate the displayed graphical output; coordinates corresponding to the position of an object in a virtual scene corresponding to the estimated gaze position of the user; telemetry from a head mounted display worn by the user; and telemetry from a handheld controller used by the user, each as described elsewhere herein;

the step of capturing data further comprises capturing one or more selected from the list consisting of a set of application variables; a set of system variables; a drawing list used in the generation of the displayed graphical output; a respective memory dump for at least part of one or more memories utilised in the generation of the displayed graphical output; a memory dump of working memory of the application; the time and date; the identity of the user; and spoken commentary uttered by the user at least between the first input and second input, each as described elsewhere herein;

the display used to display the graphical output to the user is a head-mounted display worn by the user, as described elsewhere herein; and alternatively, the display used to display the graphical output to the user is a television (or equivalently a monitor or projector or the like), as described elsewhere herein.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Accordingly, in a corresponding summary embodiment of the present description, an error logging system comprises the following.

An input (such as data port 60 of the entertainment device 10, or USB 846 of the HMD, or an internal link thereof) configured to receive from a user interface (such as HMD buttons 810, a button of a handheld controller 80, or input from a camera and the like) a first input from a user 800 indicating that they have seen a visible error in a displayed graphical output of a computer application (displayed for example on an HMD 802 or a television, not shown), as described elsewhere herein.

A gaze tracking processor (for example processor 804 of the HMD and/or CPU 20 of the entertainment device), operating in conjunction with one or more gaze tracking cameras of the HMD 844 and/or an external camera such as a webcam, not shown, and configured (for example by suitable software instruction) to track the gaze of the user to estimate the position, on at least a first display (as noted above for example an HMD or television) showing at least part of the displayed graphical output, at which the user's gaze is directed, as described elsewhere herein.

An input (optionally the same as the previous input) configured to receive from the user interface a second input from the user indicating that they have identified the visible error with their gaze; it will be appreciated that 'the user interface' may thus encompass one or more instances of an input (for example two buttons, if two buttons are used), and/or one or kinds of input (for example a microphone to enable the user to shout for example 'stop' as the first input, and a button press as the second input), as described elsewhere herein.

An error logging processor (for example processor 804 of the HMD and/or CPU 20 of the entertainment device) configured (for example by suitable software instruction) to capture data relating to the displayed graphical output of the computer application, the data comprising a capture of at least part of the displayed graphical output comprising the identified visible error, and the estimated positon of the user's gaze with respect to the displayed graphical output, as described elsewhere herein.

The error logging processor is also configured (for example by suitable software instruction) to generate an error report comprising the captured data.

The error report may be stored locally, for example in permanent storage 848 of the HMD and/or SSD 50 of the entertainment device, and/or may be set to a server or other remote computer for logging purposes.

It will be apparent to a person skilled in the art that variations in the above system corresponding to operation of the various embodiments of the method and/or apparatus as described and claimed herein are considered within the scope of the present disclosure, including but not limited to that:

the user interface comprises one or more selected from the list consisting of at least a first button or trigger on a handheld controller, at least a first button on a head-mounted display, a microphone operably coupled to a keyword recognition processor, a camera operably coupled to a gesture recognition processor, a motion detector operably coupled to a gesture recognition processor, and a gaze sequence detector operably coupled to the gaze tracking processor, as described elsewhere herein;

the system comprises a graphics processor (for example virtual reality generator 808 of the HMD and/or GPU 30 of the entertainment device) configured (for example by suitable software instruction) to display the estimated position of the user's gaze as part of the displayed graphical output visible to the user, as one or more selected from the list consisting of an indicator at the currently estimated locus of the user's gaze, and an indicator of the historical path of the user's gaze subsequent to receiving the first input from the user, as described elsewhere herein;

the display been either a head-mounted display worn by the user to display the graphical output, or a television (or equivalent) to display the graphical output to the user, as described elsewhere herein; and the system comprising an entertainment device (or equivalent console, computer, or development kit), a display (such as for example an HMD or television), and an input device (for example operable as the user interface), and in which the function of the error logging processor is implemented on the entertainment device, and the function of the gaze tracking processor is implemented at least in part on the display (e.g. the HMD), as described elsewhere herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of logging visual errors in a videogame, comprising the steps of:
   receiving from a user interface a first input from a user indicating that they have seen a visible error in a displayed graphical output of the videogame;
   tracking a gaze of the user to estimate a position, on at least a first display showing at least part of the displayed graphical output, at which the user's gaze is directed;
   receiving from the user interface a second input from the user indicating that they have identified the visible error with their gaze;
   capturing data relating to the displayed graphical output of the videogame, the data comprising a capture of at least part of the displayed graphical output comprising the identified visible error, and the estimated position of the user's gaze with respect to the displayed graphical output; and
   generating an error report comprising the captured data.

2. The method according to claim 1, in which the user interface comprises one or more of:
   i. a button or trigger on a handheld controller;
   ii. a button on a head-mounted display;
   iii. a microphone operably coupled to a keyword recognition processor;
   iv. a camera operably coupled to a gesture recognition processor;
   v. a motion detector operably coupled to the gesture recognition processor; and
   vi. a gaze sequence detector operably coupled to a gaze tracking processor.

3. The method according to claim 1, comprising the step of displaying the estimated position of the user's gaze as part of the displayed graphical output visible to the user.

4. The method according to claim 3, in which the step of displaying the estimated position comprises one or more of:
   i. displaying an indicator at a currently estimated locus of the user's gaze; and
   ii. displaying an indicator of a historical path of the user's gaze subsequent to receiving the first input from the user.

5. The method according to claim 1 in which the step of capturing data further comprises capturing one or more of:
  i. coordinates corresponding to a position of a virtual camera used to generate the displayed graphical output;
  ii. coordinates corresponding to a position of an object in a virtual scene corresponding to the estimated gaze position of the user;
  iii. telemetry from a head mounted display worn by the user; and
  iv. telemetry from a handheld controller used by the user.

6. The method according to claim 1 in which the step of capturing data further comprises capturing one or more of:
  i. a set of application variables;
  ii. a set of system variables;
  iii. a drawing list used in a generation of the displayed graphical output;
  iv. a respective memory dump for at least part of one or more memories utilised in the generation of the displayed graphical output;
  v. a memory dump of working memory of the videogame;
  vi. a time and date;
  vii. an identity of the user; and
  viii. spoken commentary uttered by the user at least between the first input and the second input.

7. The method according to claim 1, in which the display used to display the graphical output to the user is a head-mounted display worn by the user.

8. The method according to claim 1, in which the display used to display the graphical output to the user is a television.

9. A non-transitory, computer readable storage medium containing a computer program comprising computer executable instructions adapted to cause a computer system to perform a method of logging visual errors in a videogame, comprising the steps of:
  receiving from a user interface a first input from a user indicating that they have seen a visible error in a displayed graphical output of the videogame;
  tracking a gaze of the user to estimate a position, on at least a first display showing at least part of the displayed graphical output, at which the user's gaze is directed;
  receiving from the user interface a second input from the user indicating that they have identified the visible error with their gaze;
  capturing data relating to the displayed graphical output of the videogame, the data comprising a capture of at least part of the displayed graphical output comprising the identified visible error, and the estimated position of the user's gaze with respect to the displayed graphical output; and
  generating an error report comprising the captured data.

10. A videogame visual error logging system, comprising:
  an input configured to receive from a user interface a first input from a user indicating that they have seen a visible error in a displayed graphical output of a videogame;
  a gaze tracking processor configured to track a gaze of the user to estimate a position, on at least a first display showing at least part of the displayed graphical output, at which the user's gaze is directed;
  an input configured to receive from the user interface a second input from the user indicating that they have identified the visible error with their gaze;
  an error logging processor configured to capture data relating to the displayed graphical output of the videogame, the data comprising a capture of at least part of the displayed graphical output comprising the identified visible error, and the estimated position of the user's gaze with respect to the displayed graphical output; and
  the error logging processor being configured to generate an error report comprising the captured data.

11. The videogame visual error logging system according to claim 10, in which the user interface comprises one or more of:
  i. a button or trigger on a handheld controller;
  ii. a button on a head-mounted display;
  iii. a microphone operably coupled to a keyword recognition processor;
  iv. a camera operably coupled to a gesture recognition processor;
  v. a motion detector operably coupled to the gesture recognition processor; and
  vi. a gaze sequence detector operably coupled to the gaze tracking processor.

12. The videogame visual error logging system according to claim 10, comprising a graphics processor configured to display the estimated position of the user's gaze as part of the displayed graphical output visible to the user, as one or more of:
  i. an indicator at a currently estimated locus of the user's gaze; and
  ii. an indicator of a historical path of the user's gaze subsequent to receiving the first input from the user.

13. The videogame visual error logging system according to claim 10, in which the first display is a head-mounted display worn by the user to display the graphical output.

14. The videogame visual error logging system according to claim 10, in which the first display is a television to display the graphical output to the user.

15. The videogame visual error logging system according to claim 10, comprising:
  an entertainment device;
  a display; and
  an input device,
  and in which a function of the error logging processor is implemented on the entertainment device, and a function of the gaze tracking processor is implemented at least in part on the first display.

* * * * *